US 9,457,295 B2

(12) United States Patent
Ren et al.

(10) Patent No.: US 9,457,295 B2
(45) Date of Patent: Oct. 4, 2016

(54) SYSTEMS AND METHODS FOR SEPARATING MINE TAILINGS FROM WATER-ABSORBING POLYMERS AND REGENERATING THE SEPARATED WATER-ABSORBING POLYMERS

(71) Applicants: Wei Ren, Missouri City, TX (US); Paul L. Tanaka, Sugar Land, TX (US); Aaron Ortiz Gomez, Sarnia (CA); Babak A. Jajuee, Calgary (CA); Chien-Chiang Chen, Spring, TX (US); Robert D. Kaminsky, Houston, TX (US)

(72) Inventors: Wei Ren, Missouri City, TX (US); Paul L. Tanaka, Sugar Land, TX (US); Aaron Ortiz Gomez, Sarnia (CA); Babak A. Jajuee, Calgary (CA); Chien-Chiang Chen, Spring, TX (US); Robert D. Kaminsky, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 134 days.

(21) Appl. No.: 14/222,400

(22) Filed: Mar. 21, 2014

(65) Prior Publication Data

US 2014/0305873 A1 Oct. 16, 2014

(30) Foreign Application Priority Data

Apr. 10, 2013 (CA) .................................... 2812275

(51) Int. Cl.
*B01D 15/20* (2006.01)
*C02F 1/28* (2006.01)
(Continued)

(52) U.S. Cl.
CPC .............. *B01D 15/203* (2013.01); *B01J 20/26* (2013.01); *B01J 20/3425* (2013.01); *C02F 1/285* (2013.01); *C02F 11/14* (2013.01); *C02F 1/004* (2013.01);
(Continued)

(58) Field of Classification Search
None
See application file for complete search history.

(56) References Cited

U.S. PATENT DOCUMENTS

| 4,690,971 A | 9/1987 | Flesher et al. ................. 524/555 |
| 4,880,858 A | 11/1989 | Farrar et al. ..................... 524/60 |

(Continued)

FOREIGN PATENT DOCUMENTS

| CA | 2195448 | 2/1996 |
| CA | 2587166 | 9/2007 |

(Continued)

OTHER PUBLICATIONS

Dzinomwa, G. P. T. et al. (1997) "Fine Coal Dewatering using pH- and Temperature-sensitive Superabsorbent Polymers", *Polymers for Advanced Technologies*, vol. 8, pp. 767-772.
(Continued)

*Primary Examiner* — Chester Barry
(74) *Attorney, Agent, or Firm* — ExxonMobil Upstream Research Company Law Dept.

(57) ABSTRACT

Systems and methods for separating mine tailings from water-absorbing polymers and regenerating the separated water-absorbing polymers. The systems and methods include a separation assembly that is configured to receive an augmented mine tailings slurry that includes mine tailings, water, and a swollen water-absorbing polymer. The separation assembly separates the swollen water-absorbing polymer from the augmented mine tailings slurry to produce a dewatered mine tailings slurry. The systems and methods further include a water-absorbing polymer regeneration unit that is configured to receive the swollen water-absorbing polymer. The water-absorbing polymer regeneration unit at least partially releases water from the swollen water-absorbing polymer to produce a regenerated water-absorbing polymer, and as a separate output or product, the released water.

13 Claims, 3 Drawing Sheets

(51) Int. Cl.
*C02F 11/14* (2006.01)
*B01J 20/26* (2006.01)
*B01J 20/34* (2006.01)
*C02F 1/00* (2006.01)
*C02F 1/04* (2006.01)
*C02F 1/22* (2006.01)
*C02F 1/38* (2006.01)
*C02F 1/66* (2006.01)
*C02F 11/12* (2006.01)
*C02F 11/16* (2006.01)
*C02F 1/469* (2006.01)
*C02F 103/10* (2006.01)

(52) U.S. Cl.
CPC .. *C02F 1/04* (2013.01); *C02F 1/22* (2013.01); *C02F 1/38* (2013.01); *C02F 1/4698* (2013.01); *C02F 1/66* (2013.01); *C02F 11/12* (2013.01); *C02F 11/126* (2013.01); *C02F 11/127* (2013.01); *C02F 11/16* (2013.01); *C02F 2001/007* (2013.01); *C02F 2103/10* (2013.01); *C02F 2301/063* (2013.01); *C02F 2303/16* (2013.01); *C02F 2303/18* (2013.01); *C02F 2303/26* (2013.01)

(56) References Cited

U.S. PATENT DOCUMENTS

| | | | |
|---|---|---|---|
| 5,258,123 A | 11/1993 | Huang et al. | 210/663 |
| 5,391,597 A | 2/1995 | Davies et al. | 524/2 |
| 5,413,433 A | 5/1995 | Davies | 405/129 |
| 5,788,867 A | 8/1998 | Pearson | 210/733 |
| 5,807,489 A | 9/1998 | Farinato et al. | 210/734 |
| 6,262,168 B1 | 7/2001 | Huang et al. | 524/521 |
| 7,495,036 B2 | 2/2009 | Farrar et al. | |
| 7,754,087 B2 | 7/2010 | Whittaker et al. | 210/727 |
| 7,793,095 B2 | 9/2010 | Hardt | 713/155 |
| 7,867,384 B2 | 1/2011 | Coveley | |
| 8,110,095 B2 | 2/2012 | Strand | |
| 8,226,820 B1 | 7/2012 | Wegner | |
| 8,382,976 B2 | 2/2013 | Moran et al. | |
| 2007/0267355 A1 | 11/2007 | Jones et al. | 210/748 |
| 2011/0188935 A1 | 8/2011 | McColl et al. | 405/74 |
| 2011/0297381 A1 | 12/2011 | Code | 166/307 |
| 2012/0031760 A1 | 2/2012 | Cheekala et al. | |
| 2012/0097541 A1 | 4/2012 | Yazdanbod | |
| 2012/0160781 A1 | 6/2012 | D'Hollander | 210/767 |
| 2012/0241390 A1 | 9/2012 | Hassan et al. | |
| 2012/0313038 A1* | 12/2012 | Laros | C02F 11/14 252/194 |
| 2013/0001136 A1 | 1/2013 | Adeyinka et al. | |
| 2013/0056395 A1 | 3/2013 | Pierre, Jr. et al. | |
| 2013/0112561 A1 | 5/2013 | Jajuee et al. | |

FOREIGN PATENT DOCUMENTS

| | | |
|---|---|---|
| CA | 2651440 | 11/2007 |
| CA | 2407869 | 1/2010 |
| CA | 2724806 | 6/2011 |
| CA | 2515581 | 7/2011 |
| CA | 2741020 | 10/2011 |
| CA | 2736675 | 10/2012 |
| CA | 2758872 | 10/2012 |
| CA | 2757955 | 5/2013 |
| EP | 0286714 | 8/1987 |
| EP | 0195550 | 4/1989 |
| EP | 0388108 | 9/1990 |
| JP | 410085796 A1 * | 4/1998 |
| JP | 2004/190417 | 7/2004 |
| WO | WO99-46207 | 9/1999 |
| WO | WO2011-097367 | 8/2011 |
| WO | 2013/016821 | 2/2013 |

OTHER PUBLICATIONS

Huang, X. et al. (1989) "Dewatering of Biological Slurry by Using Water-Absorbent Polymer Gel," *Biotechnology and Bioengineering*, v. 34, pp. 102-109.

Peer, F. et al. (2003) "Dewatering of Coal Fines Using a Superabsorbent Polymer", *The Journal of The South African Institute of Mining and Metallurgy*, Jul./Aug. 2003, pp. 403-410.

* cited by examiner

SYSTEMS AND METHODS FOR SEPARATING MINE TAILINGS FROM WATER-ABSORBING POLYMERS AND REGENERATING THE SEPARATED WATER-ABSORBING POLYMERS

CROSS-REFERENCE TO RELATED APPLICATIONS

This application claims priority from Canadian Patent Application No. 2,812,275 filed Apr. 10, 2013 entitled SYSTEMS AND METHODS FOR SEPARATING MINE TAILINGS FROM WATER-ABSORBING POLYMERS AND REGENERATING THE SEPARATED WATER-ABSORBING POLYMERS, the entirety of which are incorporated by reference herein.

FIELD OF THE DISCLOSURE

The present disclosure is directed to systems and methods for separating mine tailings from water-absorbing polymers and regenerating the separated water-absorbing polymers.

BACKGROUND OF THE DISCLOSURE

Mining operations, including mining operations that remove bitumen from oil sands, generate a waste stream that may be referred to generally as mine tailings. These mine tailings, which often may include a significant quantity of water, may be stored in a storage facility, or storage structure, such as an enclosure, or pond. Over time, particles within the stored mine tailings may settle, producing a relatively stable suspension of the particles in the water that may have a solids content of approximately 30 wt %. This suspension may be referred to herein as mature fine tailings (MFT) and has a very low shear strength. Thus, the MFT cannot be built upon and vegetation often may not grow thereon.

Because of the long dewatering time for the MFT and the high rate at which mine tailings may be generated, large volumes of mine tailings have been, and continue to be, generated in various parts of the world. Environmental concerns, space constraints, and/or government regulations may dictate that these mine tailings be processed to a more stable form, thereby permitting reclamation of the storage facility, revegetation of the mine tailings, and/or further/other use of the storage facility. As an illustrative, non-exclusive example, Canadian Directive 74 requires that stored mine tailings be processed such that they have a shear strength of at least 5 kilopascals (kPa) within one year of storage and a shear strength of at least 10 kPa within 5 years of deposit. Meeting this directive, for example, may require dewatering of the stored mine tailings at a rate that is significantly higher than the dewatering rates that are experienced when the mine tailings are simply placed in the storage facility and allowed to dewater naturally. In addition, mining operations may consume significant quantities of water, and it may be desirable to decrease this water consumption by recovering and reusing water from the mine tailings.

Several technologies have been developed that may increase the dewatering rate of the stored mine tailings; however, these technologies often are costly to implement, require large amounts of space, and/or are ineffective at reaching a target shear strength within a desired period of time, such as to keep up with the rate at which additional mine tailings are being generated. In addition, these technologies may not decrease overall water consumption by the mining operation and/or may utilize mine tailings additives that also may be consumed in large quantities. Thus, there exists a need for improved systems and methods for dewatering mine tailings.

SUMMARY OF THE DISCLOSURE

Systems and methods for separating mine tailings from water-absorbing polymers and regenerating the separated water-absorbing polymers are disclosed herein. The systems and methods include a separation assembly that is configured to receive an augmented mine tailings slurry that includes mine tailings, water, and a swollen water-absorbing polymer. The separation assembly separates the augmented mine tailings slurry into a dewatered mine tailings slurry as one output, and a swollen water-absorbing polymer as another output. The systems and methods further include a water-absorbing polymer regeneration unit that is configured to receive the swollen water-absorbing polymer. The water-absorbing polymer regeneration unit at least partially releases water from the swollen water-absorbing polymer to produce a regenerated water-absorbing polymer as one output, and released water as another output.

In some embodiments, the separation assembly includes a vibrating screen, an air table, an air classifier, a fluidized bed separator, and/or a trammel. In some embodiments, the water-absorbing polymer regeneration unit includes an evaporator, an air blower, a heater, a chiller, a compression device, a storage tank, and/or an electrokinetic separator. In some embodiments, the water-absorbing polymer regeneration unit further includes a reconstituting unit that is configured to regulate a shape, a size, and/or a size distribution of the regenerated water-absorbing polymer.

In some embodiments, the systems and methods optionally include a mixing unit that is configured to combine a mine tailings slurry and a water-absorbing polymer to generate the augmented mine tailings slurry. In some embodiments, the released water forms a portion of a released water stream that also includes solid particles, and the systems and methods further include a solid-liquid separation unit that is configured to remove solid particles from the released water stream, thereby producing a liquid stream and solid particles (which may be in the form of a solid particles stream). In some embodiments, the systems and methods include one or more recycle structures that may be configured to recycle the regenerated water-absorbing polymer, the release water, the solid particle stream, and/or the liquid stream.

DETAILED DESCRIPTION AND BEST MODE OF THE DISCLOSURE

Figure 1:
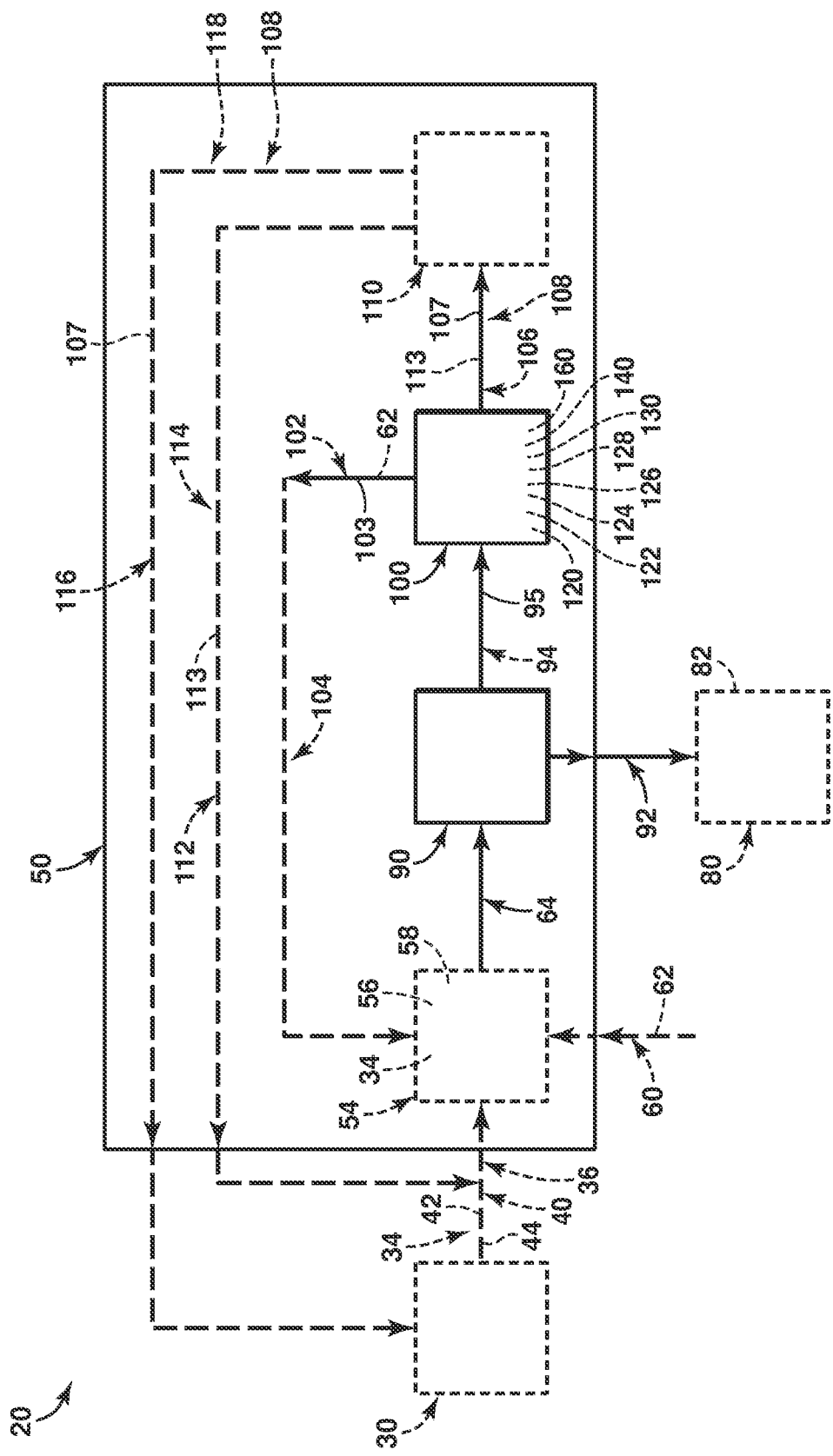
FIG. 1 is a schematic representation of illustrative, non-exclusive examples of a mine tailings dewatering assembly that may be included in and/or utilized with the systems and methods according to the present disclosure.

FIG. 1 is a schematic representation of illustrative, non-exclusive examples of a mine tailings dewatering assembly

50 that may be included in and/or utilized with the systems and methods according to the present disclosure. Mine tailings dewatering assembly 50 may form a portion of, receive one or more materials from, and/or provide one or more materials to a mining operation 20. Mining operation 20 may include a mine tailings generation site 30 that may be configured to generate, produce, and/or otherwise provide a mine tailings slurry 40, which includes mine tailings 42 and water 44. The mine tailings slurry may be provided to mine tailings dewatering assembly 50, such as via a transfer pipe 34, and the mine tailings dewatering assembly may be configured to produce at least a dewatered mine tailings slurry 92 therefrom. In addition, the mine tailings dewatering assembly also may be configured to produce released water 107 and/or solid particles 113 from the mine tailings slurry.

As illustrated in FIG. 1, mine tailings dewatering assembly 50 may include (but is not required in all embodiments to include) a mixing unit 54, which may be configured to receive mine tailings slurry 40 and a water-absorbing polymer 62. Mixing unit 54 may be configured to mix, blend, and/or otherwise combine mine tailings slurry 40 with water-absorbing polymer 62 and may be configured to generate and/or produce an augmented mine tailings slurry 64 therefrom. Subsequent to formation of augmented mine tailings slurry 64, water-absorbing polymer 62 may absorb at least a portion of water 44 that is contained therein. Thus, and after at least a threshold absorption time, augmented mine tailings slurry 64 may include a swollen water-absorbing polymer 95 and dewatered mine tailings slurry 92.

The augmented mine tailings slurry may be provided to a separation assembly 90. The separation assembly may be configured to receive the augmented mine tailings slurry and to separate swollen water-absorbing polymer 95 that is contained therein from dewatered mine tailings slurry 92. Dewatered mine tailings slurry 92 may be provided to a mine tailings disposal site 80. Swollen water-absorbing polymer 95 may be provided to a water-absorbing polymer regeneration unit 100. Water-absorbing polymer regeneration unit 100 may be configured to receive swollen water-absorbing polymer 95, to at least partially release water from the swollen water-absorbing polymer, and to produce (as separate outputs, streams, and/or other products) released water 107 and a regenerated water-absorbing polymer 103 therefrom.

As illustrated in dashed lines in FIG. 1, mining operation 20 and/or mine tailings dewatering assembly 50 optionally may include a water-absorbing polymer recycle structure 104. The water-absorbing polymer recycle structure may be configured to transport at least a portion of regenerated water-absorbing polymer 103 from water-absorbing polymer regeneration unit 100 to mixing unit 54, thereby recycling and/or reusing the portion of the regenerated water-absorbing polymer. In addition, and as also illustrated in dashed lines in FIG. 1, mining operation 20 and/or mine tailings dewatering assembly 50 also may include a released water recycle structure 108. The released water recycle structure may be configured to transport released water 107 to another portion of mining operation 20, such as to a solid-liquid separation unit 110 and/or to mine tailings generation site 30.

Released water 107 may be present within a released water stream 106, which also may (but is not required to) contain solid particles 113 (such as a portion of mine tailings 42). Solid-liquid separation unit 110, when present, may receive released water stream 106 and may be configured to separate at least a portion of solid particles 113 from at least a portion of released water 107 to produce (as separate outputs or products) a liquid stream 116 and solid particles 113, which may be in the form of a solid particles stream 112. Solids particles 113 and/or solid particles stream 112 may be mixed and/or otherwise combined with mine tailings slurry 40 via a solid particle recycle structure 114. Similarly, liquid stream 116 may be recycled within, returned to, and/or utilized within another component of mining operation 20 and/or mine tailings dewatering assembly 50, such as by being transported to mine tailings generation site 30 within a liquid stream recycle structure 118.

Mine tailings generation site 30 may include any suitable mine and/or mining operation that may produce mine tailings slurry 40 and/or mine tailings 42. This may include any suitable oil sands mine and/or tar sands mine. In addition, mine tailings generation site 30 may be configured to generate, or produce, mine tailings 42 in any suitable manner. As an illustrative, non-exclusive example, mine tailings generation site 30 may include a mining operation that may utilize hot water extraction technology to liberate bitumen from crushed bitumen-containing ore. This may include combining, or mixing, the bitumen-containing ore with hot water, a portion of which may be released water 107 and/or may be provided by liquid stream 116, and/or with one or more dispersion agents to separate the bitumen from a remainder of the bitumen-containing ore.

Mixing unit 54 may include any suitable structure that is designed and/or configured to receive mine tailings slurry 40 and water-absorbing polymer 62 and to generate augmented mine tailings slurry 64 therefrom. Illustrative, non-exclusive examples of mixing unit 54 include transfer pipe 34, a static mixer 56, and/or a stirred tank 58.

Separation assembly 90 may include any suitable structure that is designed and/or configured to receive augmented mine tailings slurry 64 and to separate the augmented mine tailings slurry into dewatered mine tailings slurry 92, as one output or other product, and swollen water-absorbing polymer 95, as another output or other product. This may include separating the augmented mine tailings slurry into separate, distinct, and/or independent flows, streams, and/or volumes of dewatered mine tailings slurry 92 and swollen water-absorbing polymer 95. As such, the dewatered mine tailings slurry and the swollen water-absorbing polymer may be spaced-apart from one another and/or otherwise separated or unmixed subsequent to separation within separation assembly 90 and/or subsequent to being produced from and/or generated by the separation assembly.

Separation assembly 90 may be configured to utilize any suitable physical (or physical property-based) separation, chemical (or chemical property-based) separation, mechanical (or mechanical property-based) separation, separation by agitation, and/or separation by filtration. Illustrative, non-exclusive examples of separation assemblies 90 that may be utilized with and/or included in the systems and methods according to the present disclosure include a vibrating screen, an air table, an air classifier, a fluidized bed separator, and/or a trammel.

Water-absorbing polymer regeneration unit 100 may include any suitable structure that is designed and/or configured to receive swollen water-absorbing polymer 95 and to at least partially dewater the swollen water-absorbing polymer to produce released water 107, as one output or product, and regenerated water-absorbing polymer 103, as another output or product. This may include separating the swollen water-absorbing polymer into separate, distinct, and/or independent flows, streams, and/or volumes of released water 107 and regenerated water-absorbing polymer 103. As such, the released water and the regenerated water-absorbing polymer may be spaced-apart from one another and/or otherwise separated or unmixed subsequent to separation within water-absorbing polymer regeneration unit 100 and/or subsequent to being produced from and/or generated by the water-absorbing polymer regeneration unit.

Water-absorbing polymer regeneration unit 100 may be configured to dewater the swollen water-absorbing polymer in any suitable manner. As illustrative, non-exclusive examples, water-absorbing polymer regeneration unit 100 may be configured to heat, cool, dehydrate, compress, and/or change a chemical environment of swollen water-absorbing polymer 95, such as by utilizing any suitable evaporator 120, air blower 122, compressor 124, heater 126, chiller 128, and/or storage tank 130.

As an illustrative, non-exclusive example, water-absorbing polymer regeneration unit 100 may be configured to heat swollen water-absorbing polymer 95, such as through the use of evaporator 120 and/or heater 126, to provide a motive force for evaporation and/or other release of released water 107 therefrom. As another illustrative, non-exclusive example, water-absorbing polymer regeneration unit 100 may be configured to remove released water 107 from swollen water-absorbing polymer 95 by directing an air stream, a dry air stream, a gas stream, and/or a fluid stream into fluid contact with the swollen water-absorbing polymer, such as through the use of air blower 122. As yet another illustrative, non-exclusive example, water-absorbing polymer regeneration unit 100 may be configured to physically, mechanically, and/or pneumatically compress swollen water-absorbing polymer 95, such as through the use of compressor 124, to squeeze and/or otherwise express released water 107 therefrom.

As another illustrative, non-exclusive example, water-absorbing polymer regeneration unit 100 may be configured to decrease a temperature of and/or freeze swollen water-absorbing polymer 95, such as through the use of chiller 128 to freeze, freeze dry, and/or otherwise release the released water from swollen water-absorbing polymer 95. As yet another illustrative, non-exclusive example, water-absorbing polymer regeneration unit 100 may be configured to change a chemical environment of swollen water-absorbing polymer 95, such as by combining the swollen water-absorbing polymer with an acid, with a base, and/or with a high ionic strength solution to provide a driving force for release of the released water therefrom.

Figure 2:
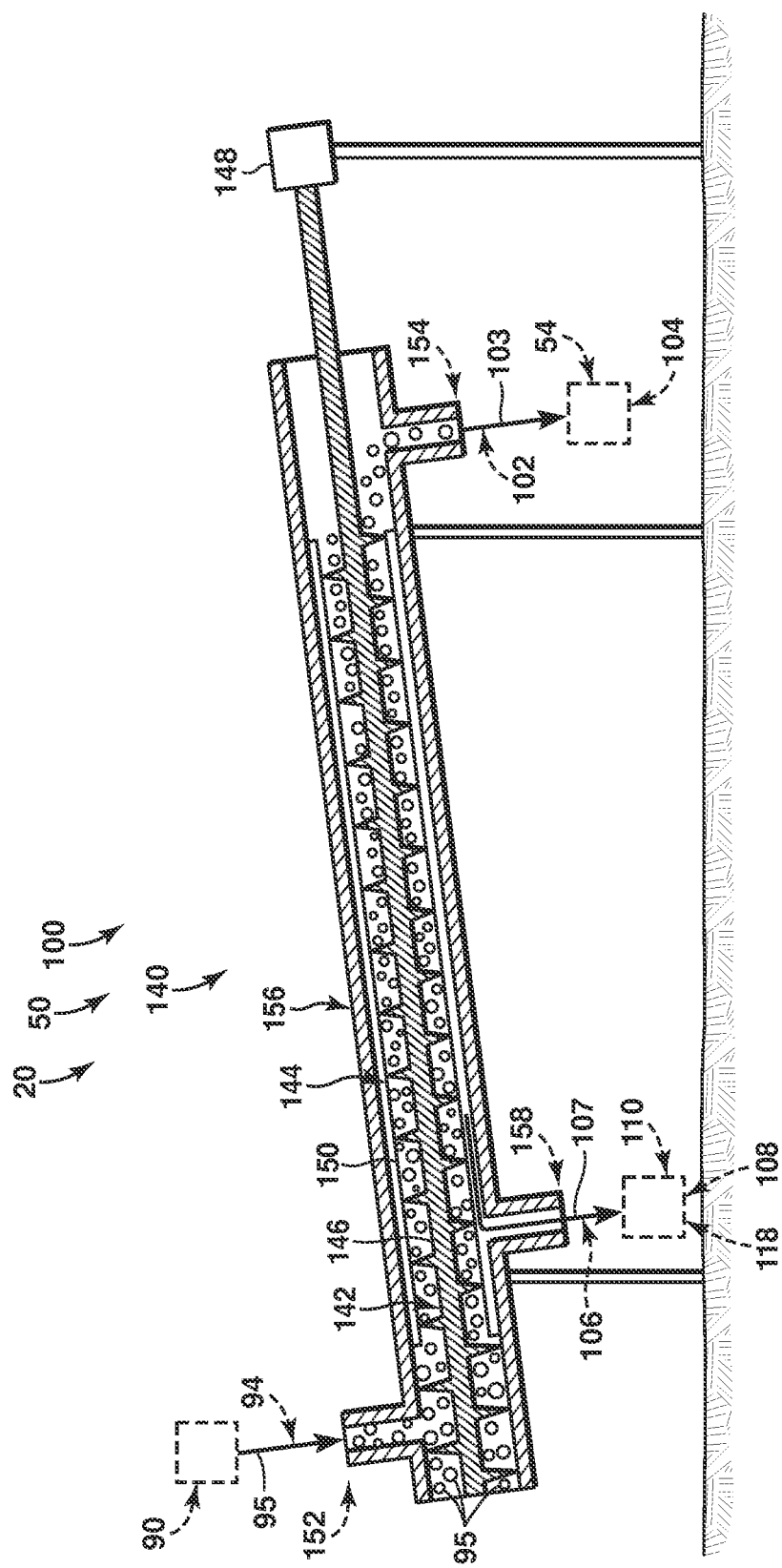
FIG. 2 provides a less schematic but still illustrative, non-exclusive example of a water-absorbing polymer regeneration unit that may be included in and/or utilized with the systems and methods according to the present disclosure.

As another illustrative, non-exclusive example, water-absorbing polymer regeneration unit 100 may include and/or be an electrokinetic separator 140, an illustrative, non-exclusive example of which is illustrated in FIG. 2. As illustrated in FIG. 2, electrokinetic separator 140 may include an anode 142 and a cathode 144, and the electrokinetic separator may be configured to apply an electric field between anode 142 and cathode 144 to provide a motive force for the separation, or release, of released water 107 from swollen water-absorbing polymer 95. As discussed, the water swollen water-absorbing polymer may be provided by and/or from separation assembly 90.

As an illustrative, non-exclusive example, anode 142 may include and/or be a spiral auger 146 that is configured to be rotated by a drive assembly 148 within a cylindrical screen 150, with cylindrical screen 150 also functioning as cathode 144. Thus, cylindrical screen 150 may be configured to surround at least a portion of a radial periphery of spiral auger 146 and may be configured to retain swollen water-absorbing polymer 95 proximal to spiral auger 146. Rotation of spiral auger 146 may provide a motive force for transport, or conveyance, of solids, such as swollen water-absorbing polymer 95 and/or regenerated water-absorbing polymer 103, along a length of spiral auger 146 and from a swollen water-absorbing polymer inlet 152 of electrokinetic separator 140 to a regenerated water-absorbing polymer outlet 154 of the electrokinetic separator, which then may provide regenerated water-absorbing polymer 103 to water-absorbing polymer recycle structure 104 and/or to mixing unit 54.

As illustrated in FIG. 2, the electric field may attract swollen water-absorbing polymer 95 to spiral auger 146 and/or may attract released water 107 to cylindrical screen 150, thereby providing for separation, or release, of released water 107 from the swollen water-absorbing polymer and generation, or production, of released water 107 and regenerated water-absorbing polymer 103 as separate, or distinct, outputs or products from the electrokinetic separator. As also illustrated in FIG. 2, electrokinetic separator 140 may include an outer housing 156 that may be configured to collect released water 107 and/or to direct released water 107 to and/or toward a released water outlet 158, which may be separate from, different from, and/or spaced apart from regenerated water-absorbing polymer outlet 154. This may include providing released water 107 to released water recycle structure 108, a solid-liquid separation unit 110, and/or liquid stream recycle structure 118, as discussed herein.

FIG. 2 illustrates a single electrokinetic separator 140 that includes a single spiral auger 146 and a single cylindrical screen 150. However, it is within the scope of the present disclosure that mining operation 20, mine tailings dewatering assembly 50, and/or water-absorbing polymer regeneration unit 100 may include any suitable number of electrokinetic separators 140, including one, two, three, four, five, or more than five electrokinetic separators, such as may depend upon a flow rate of swollen water-absorbing polymer 95 therethrough. Additionally or alternatively, it is also within the scope of the present disclosure that an individual electrokinetic separator 140 may include a plurality of spiral augers 146 that may be surrounded by a single screen 150, which may or may not be cylindrical in shape. As illustrative, non-exclusive examples, electrokinetic separator 140 may include two, three, four, five, or more than five spiral augers 146.

Returning to FIG. 1, and regardless of the specific mechanism that may be utilized to separate released water 107 from swollen water-absorbing polymer 95 to produce regenerated water-absorbing polymer 103, water-absorbing polymer regeneration unit 100 also may include and/or provide regenerated water-absorbing polymer 103 to a reconstituting unit 160 that is designed and/or configured to regulate a shape, size, and/or size distribution of the regenerated water-absorbing polymer and/or of a plurality of polymer particles that may comprise the regenerated water-absorbing polymer. When mine tailings dewatering assembly 50 includes reconstituting unit 160, and subsequent to being reconstituted within the reconstituting unit, regenerated water-absorbing polymer 103 also may be referred to herein as reconstituted water-absorbing polymer 103.

As an illustrative, non-exclusive example, when the regenerated water-absorbing polymer includes a plurality of polymer particles that are smaller and/or larger than a desired, or preselected, shape, size, and/or size distribution for the water-absorbing polymer 62 to be used in the mine tailings dewatering assembly, the reconstituting unit may be configured to combine and/or fracture the plurality of polymer particles, as necessary, to produce polymer particles having the desired shape, size, and/or size distribution. As another illustrative, non-exclusive example, and as discussed in more detail herein, reconstituting unit 160 may include one or more molds and may be configured to compress the regenerated water-absorbing polymer within the molds to regulate a shape, size, and/or size distribution thereof. As yet another illustrative, non-exclusive example, and as also discussed in more detail herein, reconstituting unit 160 also may include a pair of opposed, parallel plates and may be configured to roll the regenerated water-absorbing polymer between the plates to regulate a radius thereof.

As discussed, released water 107 may form a portion of released water stream 106, which also may include and/or contain solid particles 113. Solid-liquid separation unit 110 may include any suitable structure that is designed and/or configured to receive released water stream 106 and to remove at least a portion, if not a substantial portion, a majority portion, or even all of the solid particles therefrom. For example, the solid-liquid separation unit may be configured to separate the released water stream into solid particles stream 112, which includes at least a portion of solid particles 113, and a separate, or distinct, liquid stream 116, which includes at least a portion of released water 107. This may include separating released water stream 106 into separate, distinct, and/or independent flows, streams, and/or volumes that may form liquid stream 116 and solid particles stream 112. As such, liquid stream 116 and solid particles stream 112 may be spaced-apart and/or otherwise separated or unmixed from one another subsequent to separation within solid-liquid separation unit 110 and/or subsequent to being produced from and/or generated by the solid-liquid separation unit.

Illustrative, non-exclusive examples of solid-liquid separation unit 110 include any suitable cyclonic separator, gravity separator, centrifuge, and/or filter. As illustrated in FIG. 1, mine tailings dewatering assembly 50 further may include and/or be associated with solid particle recycle structure 114, which may be configured to transport solid particle stream 112 from the mine tailings dewatering assembly to another component of mining operation 20, such as by mixing, or combining, the solid particle stream with mine tailings slurry 40. As also illustrated in FIG. 1, mine tailings dewatering assembly 50 also may include and/or be associated with liquid stream recycle structure 118, which may be configured to transport liquid stream 116 from the mine tailings dewatering assembly to another component of mining operation 20, such as to mine tailings generation site 30.

Generally, a solids content of solid particles stream 112 may be greater than a solids content of released water stream 106 and/or may be greater than a solids content of liquid stream 116. Similarly, the solids content of liquid stream 116 may be less than the solids content of solid particles stream 112 and/or may be less than the solids content of released water stream 106. As illustrative, non-exclusive examples, solid particles stream 112 may define a solids content of at least 25 wt %, at least 30 wt %, at least 35 wt %, at least 40 wt %, at least 45 wt %, at least 50 wt %, or at least 55 wt %. As additional illustrative, non-exclusive examples, liquid stream 116 may define a solids content of less than 2 wt %, less than 1.8 wt %, less than 1.6 wt %, less than 1.4 wt %, less than 1.2 wt %, less than 1 wt %, less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %.

Mine tailings disposal site 80 may include any suitable structure and/or location that is designed and/or configured to receive dewatered mine tailings slurry 92, to at least temporarily store the dewatered mine tailings slurry, and/or to remove additional water from the dewatered mine tailings slurry. As an illustrative, non-exclusive example, mine tailings disposal site 80 may include and/or define a sloped surface 82 that is configured to receive the dewatered mine tailings slurry.

It is within the scope of the present disclosure that a majority and/or all of mine tailings dewatering assembly 50 may be located proximal to, near, adjacent to, and/or within mine tailings disposal site 80. As such, a distance between mine tailings disposal site 80 and separation assembly 90 may be less than a threshold distance, illustrative, non-exclusive examples of which include threshold distances of less than 1000 meters (m), less than 750 m, less than 500 m, less than 400 m, less than 300 m, less than 200 m, or less than 100 m.

Recycle structures 104, 108, 114, and/or 118 may include any suitable structure that may be configured and/or designed to carry, contain, and/or otherwise transport the materials and/or streams that are associated therewith. As illustrative, non-exclusive examples, the recycle structures may include and/or be any suitable fluid conduit, material conduit, pipe, auger, and/or conveyor and also may include and/or be associated with any suitable pump, compressor, and/or motor.

Transfer pipe 34 may include any suitable pipe, fluid conduit, material conduit, and/or conveyance structure that may be configured to transport mine tailings slurry 40 between mine tailings generation site 30 and mine tailings dewatering assembly 50 and/or mixing unit 54 thereof. When mining operation 20 includes solid particle recycle structure 114, transfer pipe 34 may include an injection port 36 that is configured to receive solid particle stream 112 into transfer pipe 34 and/or to combine solid particle stream 112 with mine tailings slurry 40. As discussed, mine tailings dewatering assembly 50 may be located proximal to mine tailings disposal site 80. However, mine tailings disposal site 80 may be distal from mine tailings generation site 30. As such, transfer pipe 34 may define a length of at least 100 meters (m), at least 250 m, at least 500 m, at least 750 m, at least 1000 m, at least 1500 m, at least 2000 m, at least 2500 m, at least 3000 m, at least 3500 m, at least 4000 m, at least 4500 m, or at least 5000 m.

As discussed, mine tailings slurry 40 includes mine tailings 42 and water 44 and also may be referred to herein as a mine tailings stream 40 and/or as a slurry 40 of mine tailings 42 in water 44. Mine tailings 42 may include any suitable solids, solid materials, and/or solid particles, such as sand, clay, and/or bitumen, that may be produced from mining operation 20 and/or mine tailings generation site 30. Illustrative, non-exclusive examples of mine tailings slurry 40 include mature fine tailings (MFT), fluid fine tailings (FFT), tailings solvent recovery unit (TSRU) tailings, and flotation tailings (FT).

It is within the scope of the present disclosure that mine tailings slurry 40 may define any suitable solids content (or that mine tailings 42 may comprise any suitable portion of the mine tailings slurry). As illustrative, non-exclusive examples, mine tailings slurry 40 may define a solids content of at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, or at least 60 wt %. Additionally or alternatively, mine tailings slurry 40 may define a solids content of less than 70 wt %, less than 65 wt %, less than 60 wt %, less than 55 wt %, less than 50 wt %, less than 45 wt %, less than 40 wt %, less than 35 wt %, or less than 30 wt %.

Dewatered mine tailings slurry 92 may include mine tailings 42 and water 44. However, a solids content of the dewatered mine tailings slurry (or a portion of the dewatered mine tailings slurry that is defined by mine tailings 42) may be greater than the solids content of mine tailings slurry 40. As illustrative, non-exclusive examples, the dewatered mine tailings slurry may define a solids content of at least 40 wt %, at least 45 wt %, at least 50 wt %, at least 55 wt %, at least 60 wt %, at least 65 wt %, at least 70 wt %, at least 75 wt %, or at least 80 wt %. Additionally or alternatively, the dewatered mine tailings slurry may define at least a threshold yield stress, illustrative, non-exclusive examples of which include yield stresses of at least 1 kilopascals (kPa), at least 2 kPa, at least 5 kPa, or at least 10 kPa.

Water-absorbing polymer 62 may include any suitable material and/or composition that is selected, synthesized, and/or configured to absorb at least a portion of water 44 from mine tailings slurry 40, to swell upon absorption of the water, and to produce swollen water-absorbing polymer 95. In addition, water-absorbing polymer 62 also may be selected to release water 44 within water-absorbing polymer regeneration unit 100, thereby separately producing released water 107 and regenerated water-absorbing polymer 103. Illustrative, non-exclusive examples of water-absorbing polymer 62 include any suitable water-insoluble polymer, non-ionic polymer, cationic polymer, anionic polymer, ampholytic polymer, and/or zwitterionic polymer. More specific but still illustrative, non-exclusive examples of water-absorbing polymer 62 include a crosslinked polymer, a polyacrylate, a polyacrylamide, an acrylic-acrylamide copolymer, hydrolyzed cellulose-polyacrylonitrile, a starch-polyacrylonitrile graft copolymer, and/or a maleic anhydride copolymer.

It is within the scope of the present disclosure that water-absorbing polymer 62 may be combined with mine tailings slurry 40 within mixing unit 54 in any suitable proportion and/or to produce any suitable concentration within augmented mine tailings slurry 64. As illustrative, non-exclusive examples, the concentration, on a dry weight basis, of water-absorbing polymer 62 within augmented mine tailings slurry 64 may be at least 0.001 wt %, at least 0.01 wt %, at least 0.05 wt %, or at least 0.1 wt %. Additionally or alternatively, the concentration, on a dry weight basis, of water-absorbing polymer 62 within augmented mine tailings slurry 64 may be less than 1 wt %, less than 0.75 wt %, less than 0.5 wt %, less than 0.25 wt %, less than 0.1 wt %, less than 0.05 wt %, or less than 0.01 wt %.

Water-absorbing polymer 62 may define any suitable form and/or geometry. As an illustrative, non-exclusive example, water-absorbing polymer 62 may define a plurality of polymer particles. As another illustrative, non-exclusive example, the water-absorbing polymer may define a granular structure. When the water-absorbing polymer defines the plurality of polymer particles, the plurality of polymer particles may define any suitable average, effective, and/or equivalent particle diameter. As illustrative, non-exclusive examples, the average particle diameter may be at least 50 micrometers (um), at least 75 um, at least 100 um, at least 150 um, at least 200 um, at least 300 um, at least 400 um, at least 500 um, at least 750 um, at least 1,000 um, at least 2,500 um, or at least 5,000 um. Additionally or alternatively, the average particle diameter may be less than 20,000 um, less than 15,000 um, less than 10,000 um, less than 7,500 um, less than 5,000 um, less than 2,500 um, less than 1000 um, less than 750 um, less than 500 um, or less than 250 um.

As discussed, released water stream 106 may include released water 107 and solid particles 113. It is within the scope of the present disclosure that solid particles 113 may define any suitable proportion of released water stream 106 and/or that released water stream 106 may define any suitable solids content. As illustrative, non-exclusive examples, the solids content of the released water stream may be less than 5 wt %, less than 4 wt %, less than 3 wt %, less than 2.5 wt %, less than 2 wt %, less than 1.5 wt %, less than 1 wt %, or less than 0.5 wt %.

It is within the scope of the present disclosure that the various components of mining operation 20, mine tailings generation site 30, and/or mine tailings dewatering assembly 50 that are discussed herein may be configured to perform any suitable batch process, quasi-continuous process, and/or continuous process. As such, each of the material flows that are discussed herein with reference to FIGS. 1-2 may include and/or be periodic, discontinuous, quasi-continuous, and/or continuous material flows. Thus, it is within the scope of the present disclosure that any of the material flows discussed herein may, additionally or alternatively, be referred to as material streams. As an illustrative, non-exclusive example, swollen water-absorbing polymer 95 may be transported between separation assembly 90 and water-absorbing polymer regeneration unit 100 in, or as, a swollen water-absorbing polymer stream 94. As another illustrative, non-exclusive example, regenerated water-absorbing polymer 103 may exit water-absorbing polymer regeneration unit 100 and/or be transported to mixing unit 54 in, or as, a regenerated water-absorbing polymer stream 102. As yet another illustrative, non-exclusive example, water-absorbing polymer 62 may be provided to mixing unit 54 in, or as, a water-absorbing polymer stream 60.

Figure 3:
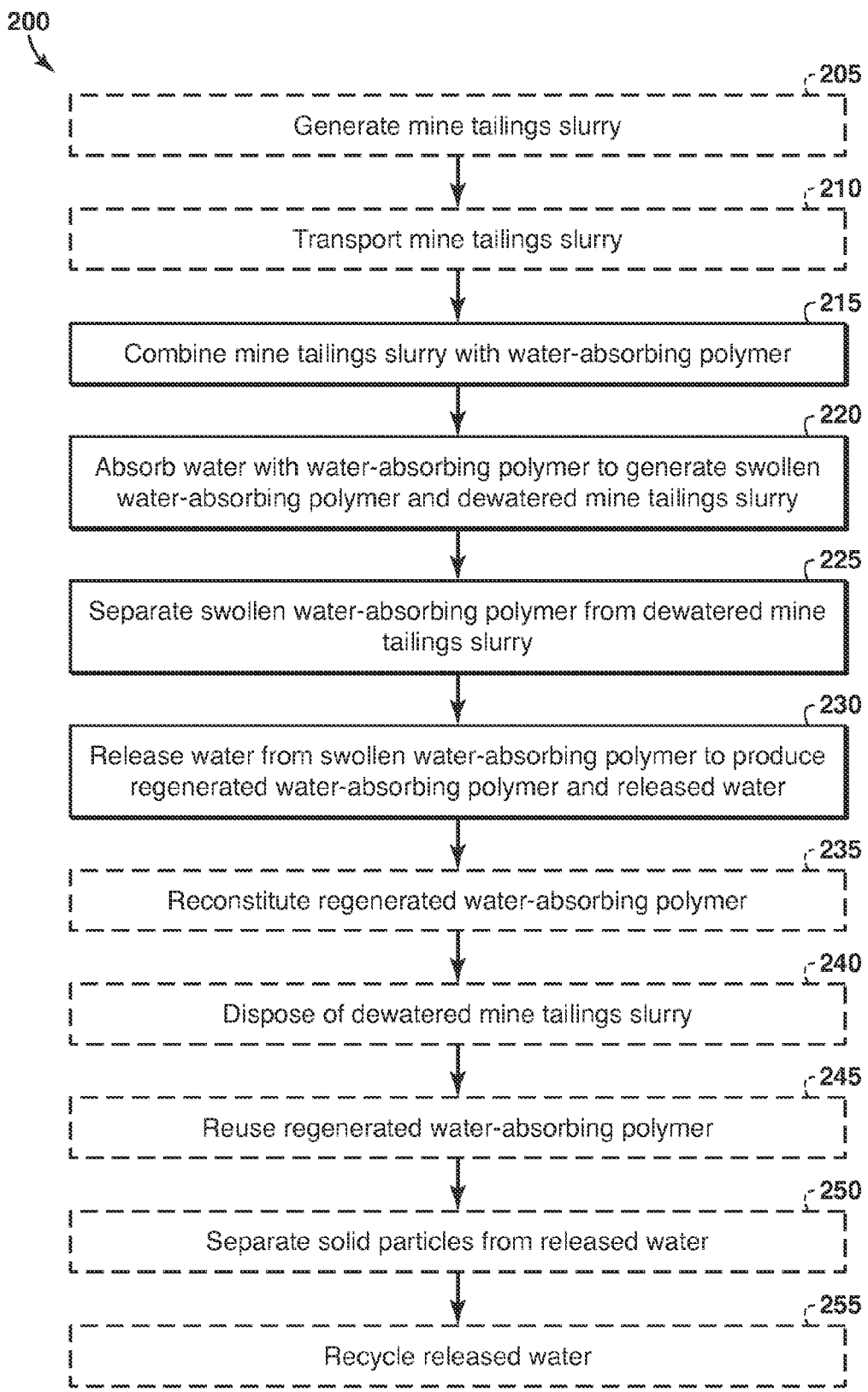
FIG. 3 is a flowchart depicting methods according to the present disclosure of dewatering mine tailings.

FIG. 3 is a flowchart depicting methods 200 according to the present disclosure of dewatering mine tailings. Methods 200 may include generating a mine tailings slurry at 205 and/or transporting the mine tailings slurry at 210. Methods 200 include combining the mine tailings slurry with a water-absorbing polymer at 215, absorbing water with the water-absorbing polymer to generate a swollen water-absorbing polymer and a dewatered mine tailings slurry at 220, separating the swollen water-absorbing polymer from the dewatered mine tailings slurry at 225, and releasing water from the swollen water-absorbing polymer at 230. Releasing water from the swollen water-absorbing polymer produces released water, and as a separate or distinct output stream, and/or other product, a regenerated water-absorbing polymer and released water. Methods 200 further may include reconstituting the regenerated water-absorbing polymer at 235, disposing of the dewatered mine tailings slurry at 240, reusing the regenerated water-absorbing polymer at 245, separating solid particles from the released water at 250, and/or recycling the released water at 255.

Generating the mine tailings slurry at 205 may include generating the mine tailings in any suitable manner and/or generating the mine tailings within any suitable mining operation and/or mine tailings generation site (such as mining operation 20 and/or mine tailings generation site 30 of FIG. 1). As an illustrative, non-exclusive example, the generating at 205 may include removing bitumen from crushed bitumen-containing ore. As additional illustrative, non-exclusive examples, the generating at 205 may include thickening, such as by adding a flocculant to, fluid fine tailings (FFT), flotation tailings (FT), mature fine tailings (MFT) and/or tailings solvent recovery unit (TSRU) tailings to generate the mine tailings slurry.

Transporting the mine tailings slurry at 210 may include transporting the mine tailings slurry from a mine tailings generation site (such as mine tailings generation site 30 of FIG. 1) to a mine tailings dewatering assembly (such as mine tailings dewatering assembly 50 of FIG. 1). This may include transporting within a transfer pipe (such as transfer pipe 34 of FIG. 1) over a length of the transfer pipe. Illustrative, non-exclusive examples of the length of the transfer pipe are discussed herein.

Combining the mine tailings slurry with the water-absorbing polymer at 215 may include combining the mine tailings slurry with the water-absorbing polymer to produce, or generate, the augmented mine tailings slurry. The combining at 215 may include flowing the mine tailings slurry and a water-absorbing polymer stream that includes the water-absorbing polymer in fluid contact with one another. The flowing may include flowing under high shear and/or turbulent flow conditions to provide, or improve, mixing between the mine tailings slurry and the water-absorbing polymer.

It is within the scope of the present disclosure that the combining at 215 may include combining in any suitable structure. As an illustrative, non-exclusive example, the combining at 215 may include flowing the mine tailings slurry through the transfer pipe and injecting the water-absorbing polymer into the mine tailings slurry within the transfer pipe. As additional illustrative, non-exclusive examples, the combining at 215 may include combining within a mixing unit (such as mixing unit 54 of FIG. 1).

Absorbing water with the water-absorbing polymer at 220 may include swelling the water-absorbing polymer with the water and/or temporarily retaining the water within the water-absorbing polymer to produce the swollen water-absorbing polymer. The absorbing may draw water away from the mine tailings that are present within the augmented mine tailings slurry and/or decrease a water content of a remainder of the augmented mine tailings slurry. Thus, the absorbing may produce the dewatered mine tailings slurry, which includes a lower water content (or a higher solids content) than that of the mine tailings slurry.

It is within the scope of the present disclosure that the absorbing at 220 may include absorbing for at least a threshold absorption time (or that methods 200 further may include waiting at least the threshold absorption time subsequent to the combining at 215 and prior to the separating at 225). As illustrative, non-exclusive examples, the threshold absorption time may be at least 1 minute, at least 2 minutes, at least 4 minutes, at least 6 minutes, at least 8 minutes, at least 10 minutes, at least 15 minutes, at least 20 minutes, at least 25 minutes, or at least 30 minutes. Additionally or alternatively, the threshold absorption time also may be less than 120 minutes, less than 110 minutes, less than 100 minutes, less than 90 minutes, less than 80 minutes, less than 70 minutes, less than 60 minutes, less than 50 minutes, less than 40 minutes, or less than 30 minutes.

Separating the swollen water-absorbing polymer from the dewatered mine tailings slurry at 225 may be accomplished in any suitable manner. As illustrative, non-exclusive examples, the separating may include physical separation, chemical separation, mechanical separation, separation by agitation, and/or separation by filtration. As another illustrative, non-exclusive example, the separating may include separating based, at least in part, on a physical property difference between the swollen water-absorbing polymer and the dewatered mine tailings slurry. Illustrative, non-exclusive examples of physical property differences include a density difference, a size difference, a shape difference, and/or a resiliency difference. As a more specific but still illustrative, non-exclusive example, the separating at 225 may include transporting the swollen water-absorbing polymer and the dewatered mine tailings slurry across one or more vibrating screens, transporting the swollen water-absorbing polymer and the dewatered mine tailings slurry across one or more air tables, transporting the swollen water-absorbing polymer and the dewatered mine tailings slurry through one or more air classifiers, transporting the swollen water-absorbing polymer and the dewatered mine tailings slurry through one or more fluidized bed separators, and/or transporting the swollen water-absorbing polymer and the dewatered mine tailings slurry through one or more trammels.

Releasing water from the swollen water-absorbing polymer at 230 may include, or result in, producing separate products, outputs, or streams of the regenerated water-absorbing polymer and of the released water. This may include dewatering, or at least partially dewatering, the swollen water-absorbing polymer. The releasing may be accomplished in any suitable manner and/or may utilize any suitable mechanism. As illustrative, non-exclusive examples, the releasing at 230 may include applying an electric field to the swollen water-absorbing polymer, applying pressure to the swollen water-absorbing polymer, applying a vacuum to the swollen water-absorbing polymer, applying a mechanical force to the swollen water-absorbing polymer, collapsing the swollen water-absorbing polymer, applying a shear stress to the swollen water-absorbing polymer, centrifuging the swollen water-absorbing polymer, hydrocycloning the swollen water-absorbing polymer, grinding the swollen water-absorbing polymer, heating the swollen water-absorbing polymer, cooling the swollen water-absorbing polymer, freezing the swollen water-absorbing polymer, and/or decreasing a humidity in a vicinity of the swollen water-absorbing polymer.

As a more specific but still illustrative, non-exclusive example, the releasing at 230 may include exposing the swollen water-absorbing polymer to a high ionic strength solution to provide an osmotic driving force for releasing at least a portion of the water from the swollen water-absorbing polymer. As another more specific but still illustrative, non-exclusive example, the releasing at 230 also may include heating the swollen water-absorbing polymer to evaporate and/or provide a motive force for removal of at least a portion of the water from the swollen water-absorbing polymer. As yet another more specific but still illustrative, non-exclusive example, the releasing at 230 also may include flowing air, or dry air, in fluid contact with the swollen water-absorbing polymer to evaporate at least a portion of the water from the swollen water-absorbing polymer.

As another more specific but still illustrative, non-exclusive example, the releasing at 230 also may include adjusting a pH (of the water and/or other fluid) in a vicinity of the swollen water-absorbing polymer to desorb at least a portion of the water from the swollen water-absorbing polymer. This may include acid treating the swollen water-absorbing polymer to decrease the pH in the vicinity of the swollen water-absorbing polymer and/or base treating the swollen water-absorbing polymer to increase the pH in the vicinity of the swollen water-absorbing polymer.

As an additional more specific but still illustrative, non-exclusive example, the releasing at 230 also may include flowing, continuously flowing, or quasi-continuously flowing, the swollen water-absorbing polymer through an electrokinetic separator (such as electrokinetic separator 140 of FIGS. 1-2). This may include applying an electric field to the swollen water-absorbing polymer within the electrokinetic separator, such as between a cathode and an anode thereof, to release water from the swollen water-absorbing polymer and produce, or generate, the released water and the regenerated water-absorbing polymer. As discussed herein with reference to FIG. 2, the electrokinetic separator may include a spiral auger, which may function as and/or be the anode, and a cylindrical screen, which may function as and/or be the cathode and may surround at least a portion of a radial periphery of the spiral auger. Under these conditions, the releasing at 230 also may include rotating the spiral auger to provide a motive force for flowing the swollen water-absorbing polymer and/or the regenerated water-absorbing polymer along a length of the spiral auger to spatially separate the released water from the regenerated water-absorbing polymer. This may include transporting the regenerated water-absorbing polymer longitudinally, or along the length of the spiral auger, while flowing the released water screen radially through the cylindrical screen.

Reconstituting the regenerated water-absorbing polymer at 235 may include forming, shaping, and/or otherwise reconstituting the regenerated water-absorbing polymer in any suitable manner. As an illustrative, non-exclusive example, the regenerated water-absorbing polymer may define a plurality of regenerated water-absorbing polymer particles, and the reconstituting at 235 may include regulating and/or defining a geometry of the regenerated water-absorbing polymer particles, a shape of the regenerated water-absorbing polymer particles, a volume of the regenerated water-absorbing polymer particles, a surface area of the regenerated water-absorbing polymer particles, a size of the regenerated water-absorbing polymer particles, and/or a surface area-to-volume ratio of the regenerated water-absorbing polymer particles. This may include producing regenerated water-absorbing polymer particles that have a defined, specified, or selected size, shape, and/or polymer particle size distribution.

As an illustrative, non-exclusive example, the reconstituting at 235 may include compressing the regenerated water-absorbing polymer into a mold to regulate the size and/or shape of the plurality of regenerated water-absorbing polymer particles. As another illustrative, non-exclusive example, the reconstituting at 235 may include rolling the plurality of regenerated water-absorbing polymer particles between parallel plates to regulate a diameter of the plurality of regenerated water-absorbing polymer particles.

As yet another illustrative, non-exclusive example, the separating at 225 may include separating based, at least in part, on a difference between a size of a plurality of swollen polymer particles that are defined by the swollen water-absorbing polymer and a size of a plurality of mine tailings particles that are defined by the mine tailings. Under these conditions, the reconstituting at 235 may include regulating a size of the regenerated water-absorbing polymer particles to maintain the difference between the size of the plurality of swollen polymer particles and the size of the plurality of mine tailings particles, thereby permitting, or improving an efficiency of, the separating at 225.

Disposing of the dewatered mine tailings slurry at 240 may include transporting the dewatered mine tailings slurry to a mine tailings disposal site (such as mine tailings disposal site 80 of FIG. 1) and/or distributing the dewatered mine tailings slurry within the mine tailings disposal site. It is within the scope of the present disclosure that at least the combining at 215, the absorbing at 220, the separating at 225, and the releasing at 230 may be performed proximal to the mine tailings disposal site. As such, the transporting may include transporting less than a threshold distance, illustrative, non-exclusive examples of which include threshold distances of less than 1000 meters (m), less than 750 m, less than 500 m, less than 400 m, less than 300 m, less than 200 m, or less than 100 m. It is also within the scope of the present disclosure that the distributing may include flowing the dewatered mine tailings slurry down a sloped surface that is within and/or defined by the mine tailings disposal site.

Reusing the regenerated water-absorbing polymer at 245 may include reusing any suitable portion of the regenerated water-absorbing polymer in any suitable manner. As an illustrative, non-exclusive example, the reusing at 245 may include combining the regenerated water-absorbing polymer with the mine tailings slurry, such as during the combining at 215.

As discussed herein, the released water may be present within a released water stream that also includes solid particles. Under these conditions, separating the solid particles from the released water at 250 may include separating, or removing, at least a portion of the solid particles from at least a portion of the released water. This may include providing the released water stream to a solid-liquid separation unit (such as solid-liquid separation unit 110 of FIG. 1) and producing a solid particles stream and a liquid stream from the solid-liquid separation unit. Illustrative, non-exclusive examples of solid-liquid separation units are discussed herein. Illustrative, non-exclusive examples of compositions of the solid particles stream and/or of the liquid stream are also discussed herein. It is within the scope of the present disclosure that, subsequent to the separating at 250, the solid particles stream may be recycled, such as by combining the solid particles stream with the mine tailings slurry via any suitable solid particle recycle structure (such as solid particle recycle structure 114 of FIG. 1).

Regardless of whether or not methods 200 include the separating at 250, methods 200 further may include recycling at least a portion of the released water at 255. This may include directly recycling at least a portion of the released water (such as when methods 200 do not include the separating at 250) and/or recycling at least a portion of the liquid stream that includes the released water (such as when methods 200 include the separating at 250). The recycling at 255 may include utilizing the released water in any suitable mining operation that may perform methods 200 and/or in any suitable mine tailings generation site that may generate the mine tailings slurry. As an illustrative, non-exclusive example, the recycling at 255 may include combining, or mixing, the released water with crushed bitumen ore to generate the mine tailings slurry.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

It is within the scope of the present disclosure that an individual step of a method recited herein, may additionally or alternatively be referred to as a "step for" performing the recited action.

INDUSTRIAL APPLICABILITY

The systems and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A mine tailings dewatering assembly, comprising:
a mixing unit that is configured to receive a mine tailings slurry, which includes mine tailings, water, and a water-absorbing polymer, to combine the mine tailings slurry with the water-absorbing polymer, and to generate an augmented mine tailings slurry therefrom, wherein the mixing unit includes at least one of a transfer pipe, a static mixer, and a stirred tank;
a separation assembly configured to receive the augmented mine tailings slurry, which includes the mine tailings, the water, and a swollen water-absorbing polymer, and to separate the swollen water-absorbing polymer from the augmented mine tailings slurry to produce a dewatered mine tailings slurry; and
a water-absorbing polymer regeneration unit configured to receive the swollen water-absorbing polymer, to at least partially release water from the swollen water-absorbing polymer, and to produce a regenerated water-absorbing polymer therefrom.

2. The assembly of claim 1, further comprising:
a transfer pipe that is configured to transport the mine tailings slurry between a mine tailings generation site and the mixing unit;
a mine tailings disposal site that is configured to receive the dewatered mine tailings slurry from the separation assembly;
an electrokinetic separator that defines at least a portion of the water-absorbing polymer regeneration unit; and
at least one of:
(i) a regenerated water-absorbing polymer recycle structure that is configured to transport the regenerated water-absorbing polymer from the water-absorbing polymer regeneration unit to the mixing unit; and
(ii) a released water recycle structure that is configured to transport the released water from the water-absorbing polymer regeneration unit to the mine tailings generation site.

3. The assembly of claim 1, wherein the separation assembly includes at least one of a vibrating screen, an air table, an air classifier, a fluidized bed separator, and a trammel.

4. The assembly of claim 1, wherein the water-absorbing polymer regeneration unit includes an electrokinetic separator.

5. The assembly of claim 4, wherein the electrokinetic separator includes an anode and a cathode, wherein the electrokinetic separator is configured to apply an electric field between the anode and the cathode to provide a motive force for release of water from the swollen water-absorbing polymer, wherein the anode is defined by a spiral auger, wherein the cathode is defined by a cylindrical screen that surrounds a radial periphery of the spiral auger, and wherein the spiral auger is configured to rotate within the cylindrical screen to convey at least one of the swollen water-absorbing polymer and the regenerated water-absorbing polymer along a length of the spiral auger.

6. The assembly of claim 1, wherein the water-absorbing polymer regeneration unit includes at least one of an evaporator, an air blower, a heater, a chiller, a compression device, and a storage tank.

7. The assembly of claim 1, wherein the water-absorbing polymer regeneration unit further includes a reconstituting unit that is configured to regulate at least one of (i) a shape of the regenerated water-absorbing polymer and (ii) a size of the regenerated water-absorbing polymer.

8. The assembly of claim 7, wherein the reconstituting unit includes at least one of a mold and a pair of parallel plates.

9. The assembly of claim 1, further comprising a regenerated water-absorbing polymer recycle structure that is configured to transport at least a portion of the regenerated water-absorbing polymer from the water-absorbing polymer regeneration unit to the mixing unit.

10. The assembly of claim 1, wherein the released water forms a portion of a released water stream that includes solid particles and the released water, and wherein the mine tailings dewatering assembly further comprises a solid-liquid separation unit that is configured to receive the released water stream and to separate the released water stream into a solid particles stream, which includes at least a portion of the solid particles, and a liquid stream, which includes at least a portion of the released water.

11. The assembly of claim 10, further comprising a solid particles recycle structure that is configured to mix the solid particles stream with the mine tailings slurry.

12. The assembly of claim 1, further comprising a released water recycle structure that is configured to transport at least a portion of the released water to the mine tailings generation site.

13. The assembly of claim 1, further comprising a mine tailings disposal site, wherein a distance between the mine tailings disposal site and the separation assembly is less than 1000 meters.

* * * * *